Jan. 10, 1956 — J. R. TILLISON — 2,730,607
FLUID HEATING UNIT
Filed Feb. 16, 1954
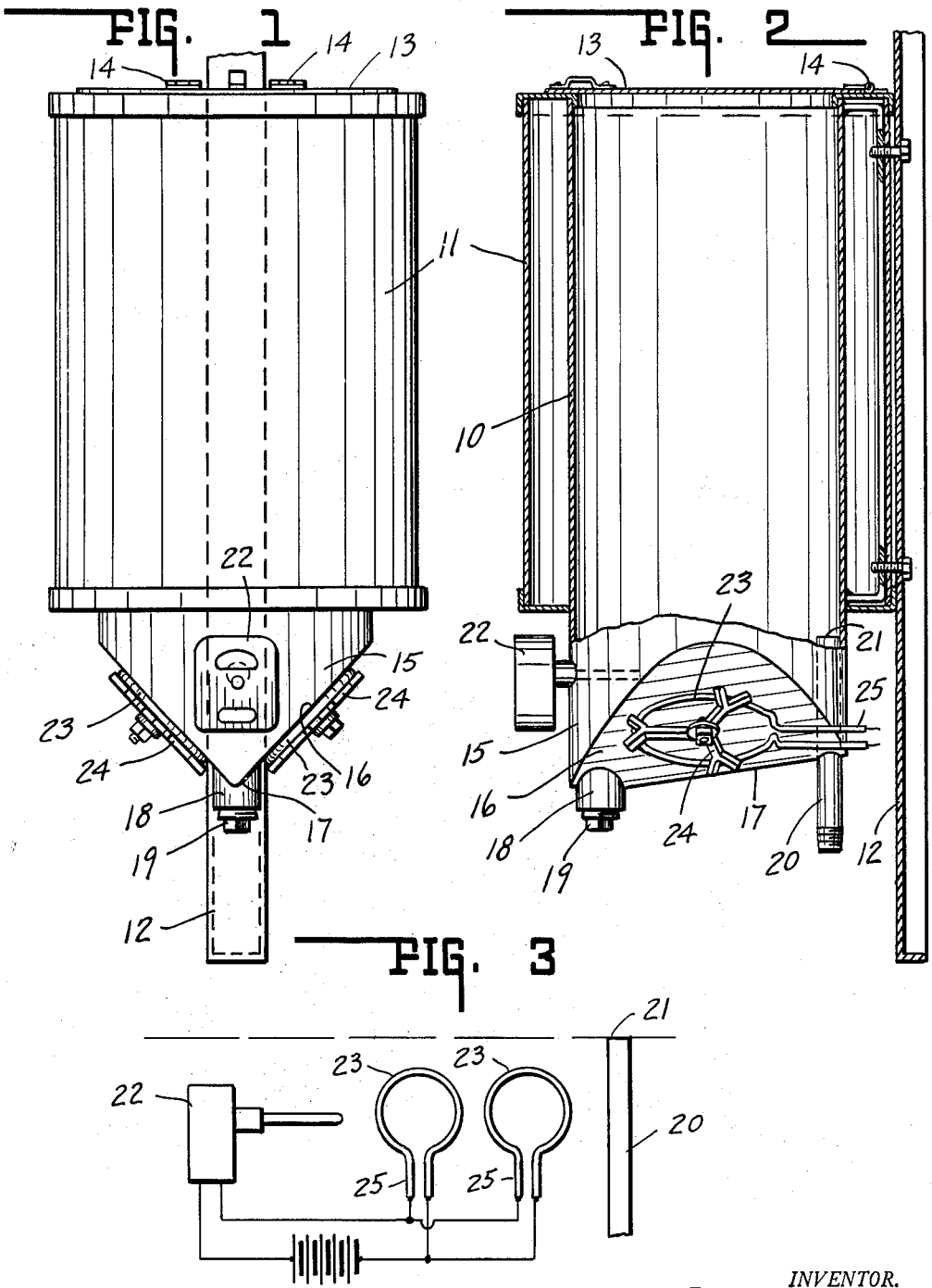
INVENTOR.
JAMES R. TILLISON.
BY
Lockwood, Galt, Woodard & Smith
ATTORNEYS.

2,730,607
Patented Jan. 10, 1956

2,730,607

FLUID HEATING UNIT

James R. Tillison, Acton, Ind.

Application February 16, 1954, Serial No. 410,676

3 Claims. (Cl. 219—38)

This invention relates to a fluid heating unit, particularly adapted for heating and maintaining a circulation of molasses of the type which is mixed with cattle feeds.

It is the purpose of this invention to provide such a heating unit which, through the medium of suitable electric heating elements, will cause a turbulence of the contents and thereby prevent sugaring in the case of molasses, and including a thermostatic control which is maintained effective irrespective of the withdrawal of the molasses, to prevent scorching or burning.

This is accomplished by providing a storage tank for the molasses with a V-shaped bottom or sump extending below the level of drainage to which the heating elements are applied as well as the thermostatic control. Thus, the level of the liquid contents of the storage tank is maintained above said elements and thermostat for maintaining the thermostat in control of the elements through the heating of the liquid in the sump, and cause a turbulence of the heated liquid therein for effecting the circulation thereof throughout the tank, and in the case of molasses prevent settling and sugaring at the bottom.

The full nature of the invention will be understood from the accompanying drawings and the following description and claims:

Fig. 1 is a front elevation of the heating unit.

Fig. 2 is a side elevation thereof with the upper portion of the tank shown in central vertical section.

Fig. 3 is a schematic illustration of the liquid level and heat control.

In the drawings there is shown a heating unit including a storage tank 10 for containing a liquid to be heated, such as molasses for mixing with cattle feeds. Surrounding the upper portion of the tank there is an insulating jacket 11, the tank and jacket being supported on a vertical supporting standard 12. The tank is provided with a cover lid 13 hinged to the jacket at 14.

The lower end of the tank extends downwardly below the jacket in the form of a V-shaped bottom or sump 15. Said sump is formed with downwardly and inwardly merging flat side walls 16, their point of merger in turn sloping downwardly, as indicated at 17, to terminate in a drainage 18 having a clean-out plug 19. Said tank is provided with an outlet conduit 20 adapted for connection with any suitable valve controlled mixing device. The intake end 21 of the conduit 20 is located within the tank above the sump or upper portions of the side walls 16 so that at all times, other than upon draining and cleaning the tank, a quantity of liquid, such as molasses, is maintained at a predetermined low level above the sump.

Mounted on the sump between the side walls there is provided a thermostatic control 22 governed by the temperature of the liquid within the sump. On each side wall 16 there is mounted an electric heating element 23 secured in position by a spider clamp 24. The heating elements 23 are connected by the electric leads 25 to a suitable source of electric current which in turn are controlled in the usual and well known manner by the thermostat 22 to maintain the liquid contents of the sump at a substantially predetermined temperature.

From the above description it will be readily understood that upon the tank being filled through the cover lid 13 with the liquid to be heated, particularly molasses for mixing with cattle feeds, and the thermostat 22 properly set with the current to the elements 23 turned on, the liquid in the sump will be heated and rise in the tank to effect a turbulent circulatory movement, in a manner to prevent sugaring of the liquid, such as molasses, at the bottom of the tank, and maintain a substantially predetermined temperature thereof. By positioning the intake end of the outlet conduit 20 above the heated sump and thermostat, a sufficient level of liquid will be maintained at all times to render the thermostat effective for controlling the heating elements. Thus, there will be no danger of the thermostat failing to function in its liquid temperature control due to lack of fluid contact therewith.

While the invention has been disclosed and described as including a jacket 11 extending downwardly over the tank 10, leaving the sump 15 exposed, it will be readily understood that the jacket can be extended to enclose the sump, or a second jacket portion can be mounted around the sump.

The invention claimed is:

1. A liquid heating unit comprising a storage tank containing a supply of liquid, a sump portion at the bottom of said tank having inwardly and downwardly merging flat side walls, an electric heating element secured to each of said side walls, a thermostat connected with said heating elements mounted on said sump communicating with the liquid contents thereof to control the heat generated by said elements, and an outlet conduit having its inner end communicating with the interior of said tank above said heating elements and thermostat to prevent withdrawal of liquid below the level of said thermostat and heating elements for maintaining effective heat control thereof.

2. A fluid heating unit comprising a storage tank containing a supply of liquid, an insulating jacket surrounding the upper portion of said tank, a cover lid for providing a removable top closure therefor, a sump portion at the bottom of said tank forming a continuation thereof below said insulating jacket, said sump portion having inwardly and downwardly merging flat side walls, an electric heating element secured to each of said side walls for heating the liquid in said sump to effect a turbulent circulation thereof through said tank, a thermostat mounted on said sump portion connected with said elements and communicating with the liquid contents thereof to control the heat generated by said elements, and an outlet conduit having its inner end communicating with the interior of said tank above said heating elements and thermostat to prevent withdrawal of liquid below the level of said thermostat and heating elements for maintaining effective heat control thereof.

3. A fluid heating unit comprising a storage tank containing a supply of liquid, a sump portion at the bottom of said tank having inwardly and downwardly sloping side walls merging at the bottom thereof into a trough-like formation, said trough-like formation sloping downwardly throughout its length terminating at its lowermost end in a drainage opening provided with a clean-out plug, an electric heating element secured to each of said side walls, a thermostat connected with said elements and mounted on said sump portion communicating with the liquid contents thereof to control the heat generated by said elements, and an outlet conduit having its inner end communicating with the interior of said tank above said heating elements and thermostat to prevent withdrawal of said liquid from said conduit to a level below said thermostat and heating elements to maintain effective heat control thereof.

References Cited in the file of this patent

UNITED STATES PATENTS

| | | |
|---|---|---|
| 1,815,589 | Saachy | July 21, 1931 |
| 2,109,212 | Ehrgott | Feb. 22, 1938 |
| 2,271,188 | Franz | Jan. 27, 1942 |
| 2,564,427 | Rugeris | Aug. 14, 1951 |